United States Patent Office 3,203,938
Patented Aug. 31, 1965

3,203,938
PROCESS FOR COPOLYMERIZING AN ALKALI METAL ETHYLENE SULFONATE IN LOWER SATURATED ALCOHOLS WITH FREE RADICAL POLYMERIZATION CATALYSTS
Robert L. Baechtold, West Orange, N.J., assignor to American Cyanamid Company, New York, N.Y., a corporation of Maine
No Drawing. Filed Nov. 10, 1961, Ser. No. 151,451
5 Claims. (Cl. 260—79.3)

This invention relates to an improved process for preparing polymers and particularly copolymers of an alkali metal ethylenesulfonate with acrylamide, acrylic acid or mixtures of these materials.

Copolymers of alkali metal ethylenesulfonates and in particular sodium ethylenesulfonate, sometimes described as sodium vinylsulfonate, and various vinyl or vinylidene compounds have been described. In fact, copolymers of sodium ethylenesulfonate and acrylamide are known.

Many copolymers of sodium ethylenesulfonate and acrylamide as prepared heretofore are characterized by a low level of monomer conversion and by the fact that the polymers produced are characterized by usually a low percent of the ethylenesulfonate component in the final polymer composition.

I have discovered that polymers and in particular copolymers of alkali metal ethylenesulfonates and acrylamide or acrylic acid may be prepared in which high conversion of the monomer to the polymer is achieved and in which the relative mole ratio between the ethylenesulfonate and the acrylamide or acrylic acid in the final polymer composition may be readily controlled over a wider range so that the ethylenesulfonate component of the polymer can be present in the final polymer composition in a substantial and even preponderant amount.

It is the principal object of the present invention to provide such a process, although other objects and advantages of the present invention will become more apparent from the description set forth hereinbelow.

In accordance with the present invention, I have found that when copolymers of alkali metal ethylenesulfonates and acrylamide or acrylic acid or mixtures of these materials are prepared in an alcoholic medium, as distinguished from an aqueous medium of the prior art, high monomer conversion is achieved of each of the components whereby a polymer having a wider range of alkali metal ethylenesulfonate content than was heretofore readily obtainable is obtained.

The alkali metal ethylenesulfonates employed in the present invention may be the sodium, potassium or lithium ethylenesulfonates, though preferably sodium ethylenesulfonates or vinylsulfonate is employed primarily because the sodium salt is more readily available and thus more economical to use.

The alcoholic medium employed for the polymerization in accordance with the process of this invention is a saturated aliphatic alcohol preferably containing from 1 to 4 carbon atoms and thus includes methyl alcohol, ethyl alcohol, the propyl alcohols and the butyl alcohols. Preferably the alcohol employed as the alcoholic medium is ethanol or ethyl alcohol.

The polymerization may be carried out in the presence of any catalyst capable of liberating free radicals under the reaction conditions employed. Thus, typical of polymerization catalysts suitable for use in the process of the present invention are the numerous peroxides, such as benzoyl peroxide, azo compounds such as azobis(isobutyronitrile), and salts of peracids, such as potassium and ammonium persulfate.

Polymerization of the alkali metal vinyl ethylenesulfonate and the acrylamide or acrylic acid in the presence of a free radical liberating polymerization catalyst will normally be carried out in the alcoholic medium at a temperature of from between about 40° C. and about 80° C., though preferably the temperature employed is from between about 50° C. and about 70° C.

The products produced by the process of this invention will contain from between 1 and 99 mole percent of the sodium ethylenesulfonate, but normally will contain from between 25 and 75 mole percent of ethylenesulfonate.

In preparing the polymers and in particular the copolymers of this invention, the alkali metal ethylenesulfonate and the acrylamide or acrylic acid are employed normally in relative mole ratios of from 3.0:1 to 0.25:1.00 and preferably in mole ratios of from 2.0:1.0 to 0.5:1.0, respectively.

As noted above, the polymers prepared in accordance with the process of the instant invention are water-soluble polymers, materials which are insoluble in alcohol. Their insolubility in the alcoholic reaction medium permits them to be readily isolated by filtration and recovered from the alcoholic reaction medium. This is a definite advantage of the polymers of the instant invention, rendering them readily recoverable from their reaction medium.

As noted above, by the present process it is possible to readily obtain polymers having a larger portion of an alkali metal ethylenesulfonate entering into the polymer than was formerly possible. In other words, the mole ratio of the alkali metal ethylenesulfonate to other monomer, whether it be acrylamide, acrylic acid or mixtures thereof in the copolymer, is much closer to the mole ratio represented by the monomers used than was heretofore believed possible.

Additionally, the new process results in a much higher over-all conversion of monomers to polymers, normally at least 65% and preferably at least 80% conversion. For a given amount of conversion it is now possible to carry out the polymerization at a lower concentration of an alkali metal ethylenesulfonate than was formerly possible.

The critical aspects of the present invention appear to be the use of the lower aliphatic monohydric alcohols as the reaction medium, the use of a particular alkylenesulfonate and the third important variable the use of acrylamide or acrylic acid as a second vinyl monomer. As will be seen in the examples hereinafter, it is essential that these three elements of the instant invention be employed simultaneously in the process. Thus, as will be seen in the following examples, attempts to copolymerize sodium ethylenesulfonate with methacrylamide were unsuccessful, as were attempts to copolymerize sodium β-propylenesulfonate instead of sodium ethylenesulfonate with acrylamide.

Copolymers of the present invention may be employed as tanning agents, emulsifying agents, flame-proofing agents for fibrous materials, ion exchange resins, catalysts, water thickeners for cosmetics, in adhesives and in oil well drilling muds.

In particular, the copolymers of this invention have been found to be useful as antistatic agents for synthetic hydrophobic textile materials. Such a use is the subject of my copending application, Serial No. 188,871, filed April 19, 1962, which is a continuation-in-part of Serial No. 151,454, filed November 10, 1961, now U.S. Patent 3,134,686.

In order to illustrate the present invention, the following examples are given primarily by way of illustration. No specific details or enumerations contained therein should be construed as limitations on the present invention except insofar as they appear in the appended claims. All parts and percentages are by weight unless otherwise specifically designated.

Example 1

A mixture of 10.0 parts (0.077 mole) of sodium ethylenesulfonate (A), 5.0 parts (0.071 mole) of acrylamide (B), 40 parts of ethanol and 0.03 part of azobis(isobutyronitrile) was refluxed (78° C.) for 4 hours. The polymer was separated by filtration. The ratio of monomers in the polymer was calculated from the amounts of sulfur and nitrogen found in the polymer by assay.

Conversion of monomers to polymer=94%.
Molar ratio of monomers in the reaction mixture, $A/B=1.08/1.00$.
Molar ratio of monomers in polymer, $A/B=0.98/1.00$.

Example 2

A mixture of 10.0 parts (0.077 mole) of sodium ethylenesulfonate (A), 5.0 parts (0.071 mole) of acrylamide (B), 50 parts of water and 0.03 part of potassium persulfate was heated at 80° C. for 4 hours.

Conversion of monomers to polymer=51.2%.
Conversion of A to polymer=20.5%.
Molar ratio of monomers in the reaction mixture, $A/B=1.08/1.0$.
Molar ratio of monomers in polymer, $A/B=0.23/1.00$.

Comparing Example 2 with Example 1, it will be seen that by employing ethanol as the reaction medium in Example 1 that both a higher conversion of the sodium ethylenesulfonate to polymer is achieved as well as an over-all conversion of monomer to polymer, which in turn is reflected in the improved ethylenesulfonate content of the final copolymer.

Example 3

A mixture of 10.0 parts (0.077 mole) of sodium ethylenesulfonate (A), 2.5 parts (0.035 mole) of acrylamide (B), 40 parts of ethanol and 0.4 part of azobis(isobutyronitrile) was refluxed (78° C.) for 2 hours.

Conversion of monomers to polymer=65%.
Molar ratio of monomers in the reaction mixture, $A/B=2.20/1.00$.
Molar ratio of monomers in polymer, $A/B=1.23/1.00$.

Example 4

A mixture of 7.5 parts (0.058 mole) of sodium ethylenesulfonate (A), 7.5 parts (0.106 mole) of acrylamide (B), 40 parts of methanol and 0.03 part of azobis(isobutyronitrile) was heated at 50° C. for 7 hours.

Conversion of monomers to polymer=68%.
Conversion of A to polymer=53.5%.
Molar ratio of monomers in the reaction mixture, $A/B=0.55/1.00$.
Molar ratio of monomers in the polymer, $A/B=0.36/1.00$.

Example 5

A mixture of 7.5 parts (0.058 mole) of sodium ethylenesulfonate (A), 7.5 parts (0.106 mole) of acrylamide (B), 50 parts of water and 0.03 part of potassium persulfate was heated at 50° C. for 7 hours.

Conversion of monomers to polymer=48.1%.
Conversion of A to polymer=8.41%.
Molar ratio of monomers in the reaction mixture, $A/B=0.55/1.00$.
Molar ratio of monomers in polymer, $A/B=0.059/1.00$.

A comparison of Example 5 with Example 4 demonstrates that the employment of ethanol as the reaction medium results in a greater over-all conversion of monomer to polymer, a greater over-all conversion of ethylenesulfonate to polymer, and a much more substantial ethylenesulfonate content in the final polymer composition.

Example 6

A mixture of 15.0 parts (0.115 mole) of sodium ethylenesulfonate (A), 7.5 parts (0.106 mole) of acrylamide (B), 20 parts of ethanol, 20 parts of methanol and 0.03 part of azobis(isobutyronitrile) was heated at 50° C. for 5.5 hours.

Conversion of monomers to polymer=66.3%.
Molar ratio of monomers in the reaction mixture, $A/B=1.08/1.00$.
Molar ratio of monomers in polymer, $A/B=0.54/1.00$.

Example 7

A mixture of 30.0 parts (0.231 mole) of sodium ethylenesulfonate (A), 14.0 parts (0.197 mole) of acrylamine (B), 80 parts of ethanol and 0.06 part of lauroyl peroxide was heated at 55° C. for 21 hours.

Conversion of monomers to polymer=87.5%.
Molar ratio of monomers in reaction mixture, $$A/B=1.17/1.00$$

Molar ratio of monomers in polymer, $A/B=0.96/1.00$.

Example 8

A mixture of 5.0 parts (0.038 mole) of sodium ethlyenesulfonate (A), 10.0 parts (0.139 mole) of acrylic acid (B), 40 parts of ethanol and 0.03 part of azobis(isobutyronitrile) were heated at 60° C. for 6 hours.

Conversion of monomers to polymer=89%.
Conversion of A to polymer=67%.
Molar ratio of monomers in reaction mixture, $$A/B=0.27/1.00$$

Example 9

A mixture of 5.0 parts (0.038) mole of sodium ethylenesulfonate (A), 10.0 parts (0.139 mole) of acrylic acid (B), 50 parts of water and 0.03 part of potassium persulfate was heated at 60° C. for 6 hours.

Conversion of monomers to polymer=79.8%.
Conversion of A to polymer=22.8%.
Molar ratio of monomers in reaction mixture, $$A/B=0.27/1.00$$

Molar ratio of monomers in polymer, $$A/B=0.063/1.00$$

By comparing Example 9 with Example 8 of the instant invention, it will be further seen that the employment of alcohol as the reaction medium results in substantially improved conversion of the ethylenesulfonate into the final polymer composition. Thus, in Example 8 is will be seen that the $A/B$ ratio is 0.19/1.00, while in Example 9, wherein the medium was aqueous, the $A/B$ ratio was equal to 0.063/1.00.

Example 10

A mixture of 10.0 parts (0.077 mole) of sodium ethylenesulfonate (A), 5.0 parts (0.059 mole) of methacrylamide (B), 50 parts of ethanol and 0.03 part of azobis(isobutylronitrile) was heated at 50° C. for 5 hours.

Conversion of monomers to polymer=36.0%.
Conversion of A to polymer=26%.
Molar ratio of monomers in reaction mixture, $$A/B=1.30/1.00$$

Molar ratio of monomers in polymer, $A/B=0.91/1.00$.

Example 11

A mixture of 7.5 parts (0.052 mole) of sodium β-propylenesulfonate (A), 7.5 parts (0.105 mole) of acrylamide (B), 50 parts of ethanol and 0.03 part of azobis(isobutyronitrile) was heated at 50° C. for 4½ hours.

Conversion of monomers to polymer=54.6%.
Molar ratio of monomers in reaction mixture, $$A/B=.495/1.00$$

Molar ratio of monomers in polymer, $A/B=.255/1.00$.

In addition to the alkali metal ethylenesulfonate, acrylamide and acrylic acid contemplated for use as monomers in the process of the instant invention, it is contemplated that terpolymers and other water-soluble polymeric materials may be prepared by the inclusion of various other monomers, so long as the principal unobvious effects accomplished by the process of this invention are not obviated.

I claim:

1. A process for preparing low molecular weight water-soluble polymers which comprises copolymerizing an alkali metal ethylenesulfonate and a monomer of the group consisting of acrylamide and acrylic acid in a lower saturated aliphatic alcohol in the presence of free radical initiating polymerization catalyst selected from the group consisting of inorganic catalyst, organic catalyst, and mixtures thereof.

2. A process according to claim 1 in which acrylamide is employed.

3. A process according to claim 1 in which acrylic acid is employed.

4. A process for preparing low molecular weight water-soluble polymers which comprises coplymerizing sodium ethylenesulfonte and acrylamide in ethyl alcohol and in the presence of a free radical initiating polymerization catalyst selected from the group consisting of inorganic catalyst, organic catalyst, and mixtures thereof.

5. A process for preparing low molecular weight water-soluble polymers which comprises copolymerizing sodium ethylenesulfonate and acrylic acid in ethyl alcohol and in the presence of a free radical initiating polymerization catalyst selected from the group consisting of inorganic catalyst, organic catalyst, and mixtures thereof.

References Cited by the Examiner

UNITED STATES PATENTS 2,834,759   5/58   Austin _____ 260—79.3

OTHER REFERENCES

Breslow et al.: J. Polymer Science, vol. 27, pp. 295–312 (pages 298 and 99 relied upon (1958).

JOSEPH L. SCHOFER, *Primary Examiner.*